United States Patent
Adachi et al.

(10) Patent No.: US 11,965,274 B2
(45) Date of Patent: Apr. 23, 2024

(54) NON-WOVEN FABRIC AND FILTER USING SAME

(71) Applicant: TOYO ALUMINIUM EKCO PRODUCTS CO., LTD., Osaka (JP)

(72) Inventors: Masashi Adachi, Osaka (JP); Takuto Yamagishi, Osaka (JP)

(73) Assignee: TOYO ALUMINIUM EKCO PRODUCTS CO., LTD., Osaka (JP)

( * ) Notice: Subject to any disclaimer, the term of this patent is extended or adjusted under 35 U.S.C. 154(b) by 443 days.

(21) Appl. No.: 17/441,568

(22) PCT Filed: Mar. 27, 2020

(86) PCT No.: PCT/JP2020/013894
§ 371 (c)(1),
(2) Date: Sep. 21, 2021

(87) PCT Pub. No.: WO2020/203719
PCT Pub. Date: Oct. 8, 2020

(65) Prior Publication Data
US 2022/0162785 A1 May 26, 2022

(30) Foreign Application Priority Data

Mar. 29, 2019 (JP) .................................. 2019-065674

(51) Int. Cl.
*D04H 1/541* (2012.01)
*B01D 39/16* (2006.01)
(Continued)

(52) U.S. Cl.
CPC ....... *D04H 1/5412* (2020.05); *B01D 39/1623* (2013.01); *D04H 1/5418* (2020.05);
(Continued)

(58) Field of Classification Search
CPC ........... F24F 8/108; B01D 39/16–1692; B01D 2239/0457; B01D 2239/0618; B01D 2239/1275; B01D 2239/1291
See application file for complete search history.

(56) References Cited

FOREIGN PATENT DOCUMENTS

| EP | 0151485 A1 | 8/1985 |
|---|---|---|
| JP | S60-168000 A | 8/1985 |

(Continued)

OTHER PUBLICATIONS

English Translation of the Written Opinion of the International Searching Authority for PCT/JP2020/013894, dated Jun. 16, 2020 (Year: 2020).*

(Continued)

*Primary Examiner* — Robert Clemente
(74) *Attorney, Agent, or Firm* — Rabin & Berdo, P.C.

(57) ABSTRACT

A non-woven fabric body (11) that forms a non-woven fabric (1) is formed by integrating composite polyester fibers (2) and flame-retardant acrylic fibers (3) which serve as the other fibers of the rest. The composite polyester fibers (2) have a core-sheath structure in which a sheath portion (4) is formed of a low melting point polyester and a core portion (5) is formed of a high melting point polyester having a higher melting point than that of the low melting point polyester. The composite polyester fibers (2) are contained in an amount of 15% to 80% by weight in a total of 100% by weight of the non-woven fabric body (11). Further, an apparent density of the non-woven fabric body (11) ((a basis weight of the non-woven fabric body)/(a thickness of the non-woven fabric body)) is 0.005 g/cm³ to 0.040 g/cm³. In addition, a bending resistance of the non-woven fabric body (11) in a flow direction of the fibers is 50 mN·cm to 220 mN·cm, and a bending resistance in a width direction that is orthogonal to the flow direction is 20 mN·cm to 140 mN·cm.

6 Claims, 2 Drawing Sheets

(51) Int. Cl.
  *D04H 1/55* (2012.01)
  *F24F 8/108* (2021.01)
(52) U.S. Cl.
  CPC ............... *D04H 1/55* (2013.01); *F24F 8/108* (2021.01); *B01D 2239/0457* (2013.01); *B01D 2239/0618* (2013.01); *B01D 2239/1275* (2013.01); *B01D 2239/1291* (2013.01)

(56) References Cited

FOREIGN PATENT DOCUMENTS

| JP | H0531310 A | 2/1993 |
|---|---|---|
| JP | H05-212224 A | 8/1993 |
| JP | 2000-045125 A | 2/2000 |
| JP | 2003-236320 A | 8/2003 |
| JP | 2006241642 A | 9/2006 |
| JP | 2006-281108 A | 10/2006 |
| JP | 2013085541 A | 5/2013 |
| JP | 2017206777 A | 11/2017 |
| WO | 2019/065807 A1 | 4/2019 |

OTHER PUBLICATIONS

Excerpts of 1) JIS L 1913 (Test methods for nonwovens, established Apr. 20, 1998, https://jis.eomec.com/jisl19132010#gsc.tab=0) 2) JIS L 1096 (Testing methods for woven and knitted fabrics, established Mar. 1, 1979. https://jis.eomec.com/jisl10962010#gsc.tab=0).

International Search Report for PCT/JP2020/013894, dated Jun. 16, 2020 (English translation provided).

* cited by examiner

NON-WOVEN FABRIC AND FILTER USING SAME

TECHNICAL FIELD

The present invention relates to a non-woven fabric and a filter using the non-woven fabric, and more particularly to a non-woven fabric and a filter using the non-woven fabric used to prevent stains on a range hood, a ventilation fan, a vent, and the like.

BACKGROUND ART

In the related art, a non-woven fabric formed of synthetic fibers has been used as a filter used to prevent stains on a range hood and a ventilation fan.

For example, JP-A-2003-236320 discloses a non-woven fabric, which is manufactured, after forming a fiber web (also called a curd) by mixing a meltable synthetic fiber such as polyester fiber and a non-meltable fiber such as rayon fiber, by applying a binder (adhesive, binder) for interfiber bonding made of flame-retardant thermoplastic resin to the fiber web by spraying and the like, and a filter using the non-woven fabric. When a flame retardant such as a phosphorus-based water-soluble flame retardant compound is added to the binder, and such a filter is used as a filter for preventing stains on a range hood and a ventilation fan, the presence of the flame retardant throughout the non-woven fabric of the filter prevents the non-woven fabric from burning easily if a fire touches the filter.

However, in a non-woven fabric using a binder as in JP-A-2003-236320, the binder is applied only to a surface layer of the non-woven fabric and does not sufficiently penetrate to an inner side of the non-woven fabric, and flame retardancy may not be uniform. Further, when the binder is sufficiently penetrated to the inner side to improve the flame retardancy on the inner side, a large amount of binder is required, which not only increases a manufacturing cost, but also may reduce an air permeability by filling or narrowing gaps between fibers with the binder. When the non-woven fabric is used as a filter, a function as the filter may be adversely affected if the air permeability is reduced.

Further, since a composition of such a non-woven fabric is formed of fibers and a binder, when an absolute amount of fibers that form the non-woven fabric in an unit basis weight is reduced, and it is desired to increase bulk of the non-woven fabric or strengthen the so-called stiffness (shape retention related to flexural rigidity, elasticity, and the like), it is necessary to increase the basis weight. In particular, when the non-woven fabric is mounted on a ceiling position such as a range hood or a slope thereof and a mounting area is large, if the non-woven fabric is no stiffness, the non-woven fabric may be bent in the middle during mounting, which may take time and effort for mounting.

Therefore, JP-A-2006-281108 discloses a non-woven fabric using a bonding method called the so-called thermal bonding method, which uses a heat-sealing property of fibers that form the non-woven fabric, to bond the fibers to each other without using a binder as in JP-A-2003-236320, and a filter using the non-woven fabric.

CITATION LIST

Patent Literature

PTL 1: JP-A-2003-236320
PTL 2: JP-A-2006-281108

However, in the case of the thermal bonding method as in JP-A-2006-281108, when the heat bonding is performed by contact heating in which a heat source body is brought into direct contact with the fibers, the non-woven fabric is compressed by the heat source body, and therefore, bulkiness is lowered. When the bulkiness is too low, a fiber density in a non-woven fabric structure may increase too much, the air permeability of the non-woven fabric may decrease, and the non-woven fabric may become too stiff and hard. Further, softness of the non-woven fabric due to touch of a finger (also referred to as "elasticity" in the present specification, and may be generally referred to as "fluffy feeling") changes depending on a size of voids between the fibers. The elasticity has a certain degree of a correlation with oil absorption of oil smoke and a collection property of dust and dirt when the non-woven fabric is used as a filter for preventing stains on a range hood and a ventilation fan. There is a tendency that if the elasticity is high, the air will easily enter the inside of the non-woven fabric, and the oil absorption and the collection property will be high, and if the elasticity is low, the air will not easily enter the inside of the non-woven fabric, and the oil absorption and the collection property will be low. Then, as described above, the fiber density may increase too much, the air permeability may decrease, and the non-woven fabric which is too stiff and hard may have low elasticity.

Such a problem also exists in a non-woven fabric used for applications other than the filter for preventing stains on the range hood, the ventilation fan, and the like.

The invention has been made to solve the above problems, and an object of the invention is to provide a non-woven fabric in which constituent fibers are sufficiently bonded to each other and which has appropriate elasticity as well as a strength of stiffness, and a filter using the non-woven fabric.

SUMMARY OF INVENTION

In order to achieve the above object, a non-woven fabric according to a first aspect of the invention is a non-woven fabric, which is formed of a composite polyester fiber having a core-sheath structure in which a sheath portion is a low melting point polyester and a core portion is a high melting point polyester having a higher melting point than that of the low melting point polyester and other fibers of the rest, includes a non-woven fabric body in which the composite polyester fiber and the other fibers of the rest are integrated, in which the non-woven fabric body contains the composite polyester fiber in an amount of 15% by weight or more and 80% by weight or less based on a total amount of 100% by weight of the non-woven fabric body, when an apparent density of the non-woven fabric body=(a basis weight of the non-woven fabric body)/(a thickness of the non-woven fabric body), the apparent density of the non-woven fabric body is 0.005 g/cm$^3$ or more and 0.040 g/cm$^3$ or less, and a bending resistance of the non-woven fabric body in a first direction is 50 mN·cm or more and 220 mN·cm or less, and a bending resistance in a second direction, which is orthogonal to the first direction, is 20 mN·cm or more and 140 mN·cm or less.

With this configuration, the fibers are sufficiently bonded to each other, and the non-woven fabric has strong stiffness and also has appropriate elasticity.

In the non-woven fabric according to a second aspect of the invention, in the configuration of the invention in the first aspect, the non-woven fabric body has a basis weight of 40 g/m$^2$ or more and 80 g/m$^2$ or less, and a bending resistance ratio (the bending resistance in the first direction/the bending resistance in the second direction) between the bending resistance in the first direction and the bending resistance in the second direction is within a range of more than 1.0 and 4.0 or less.

With this configuration, it becomes easy to cut the non-woven fabric to an assumed dimension, and when a desired adhesive pattern is to be formed on a filter using the non-woven fabric, it becomes easy to form the adhesive pattern.

In the non-woven fabric according to a third aspect of the invention, in the configuration of the invention in the first aspect or the second aspect, the rest contains flame-retardant fibers.

With this configuration, flame retardancy can be imparted to the non-woven fabric.

In the non-woven fabric according to a fourth aspect of the invention, in the configuration of the invention in the third aspect, the flame-retardant fiber contains a flame-retardant acrylic fiber or a flame-retardant polyester fiber.

With this configuration, the non-woven fabric exhibits sufficient flame retardancy.

In the non-woven fabric according to a fifth aspect of the invention, in the configuration of the invention in any one of the first to fourth aspects, a melting point of the low melting point polyester is 100° C. or more and 140° C. or less, and the composite polyester fiber contains 20% by weight or more and 50% by weight or less of the low melting point polyester based on a total amount of 100% by weight of the composite polyester fiber.

With this configuration, a sufficiently integrated non-woven fabric body is obtained.

A filter according to a sixth aspect of the invention is a filter for preventing stains on a range hood or a ventilation fan using the non-woven fabric in any one of the third to fifth aspects.

With this configuration, the filter has flame retardancy.

As described above, in the non-woven fabric according to the first aspect of the invention, the fibers are sufficiently bonded to each other and the non-woven fabric has strong stiffness, and therefore, the non-woven fabric is suitable for manufacturing a filter. Further, since the non-woven fabric has an appropriate elasticity, the non-woven fabric has high oil absorption and collection property and good processability into a filter.

In addition to the effects of the invention in the first aspect, in the non-woven fabric according to the second aspect of the invention, the non-woven fabric can be easily cut to the assumed dimension, and when the desired adhesive pattern is to be formed on the filter using the non-woven fabric, the formation is easy, and therefore, the non-woven fabric suitable for manufacturing a filter is obtained.

In addition to the effects of the invention in the first or second aspect, in the non-woven fabric according to the third aspect of the invention, the flame retardancy can be imparted to the non-woven fabric, and therefore, a non-woven fabric suitable for manufacturing a filter preferably having flame retardancy is obtained.

In addition to the effects of the invention in the third aspect, the non-woven fabric according to the fourth aspect of the invention is a non-woven fabric that exhibits sufficient flame retardancy, and therefore, it is possible to manufacture a filter having sufficient flame retardancy.

In addition to the effects of the invention in any one of the first to fourth aspects, the non-woven fabric according to the fifth aspect of the invention is a sufficiently integrated non-woven fabric body, and therefore, the non-woven fabric is more suitable for manufacturing a filter.

In addition to the effects of the invention in any one of the third to fifth aspects, the filter according to the sixth aspect of the invention is a filter having flame retardancy, and therefore, it is suitable as a filter for preventing stains on a range hood or a ventilation fan that can reach a high temperature during use.

DESCRIPTION OF EMBODIMENTS

A non-woven fabric according to an embodiment of the invention is a non-woven fabric, which is formed of a composite polyester fiber having a core-sheath structure in which a sheath portion is a low melting point polyester and a core portion is a high melting point polyester having a higher melting point than that of the low melting point polyester and other fibers of the rest. The non-woven fabric includes a non-woven fabric body in which the composite polyester fiber and the other fibers of the rest are integrated. The non-woven fabric body contains the composite polyester fiber in an amount of 15% by weight or more and 80% by weight or less based on a total amount of 100% by weight of the non-woven fabric body. When an apparent density of the non-woven fabric body=(a basis weight of the non-woven fabric body)/(a thickness of the non-woven fabric body), the apparent density of the non-woven fabric body is 0.005 g/cm$^3$ or more and 0.040 g/cm$^3$ or less. A bending resistance of a fiber of the non-woven fabric body in a first direction is 50 mN·cm or more and 220 mN·cm or less, and a bending resistance in a second direction, which is orthogonal to the first direction, is 20 mN·cm or more and 140 mN·cm or less.

With this configuration, the fibers are sufficiently bonded to each other and the non-woven fabric has strong stiffness, and therefore, the non-woven fabric is suitable for manufacturing a filter. Further, since the non-woven fabric has an appropriate elasticity, the non-woven fabric has high oil absorption and collection property and good processability into a filter.

Figure 1:
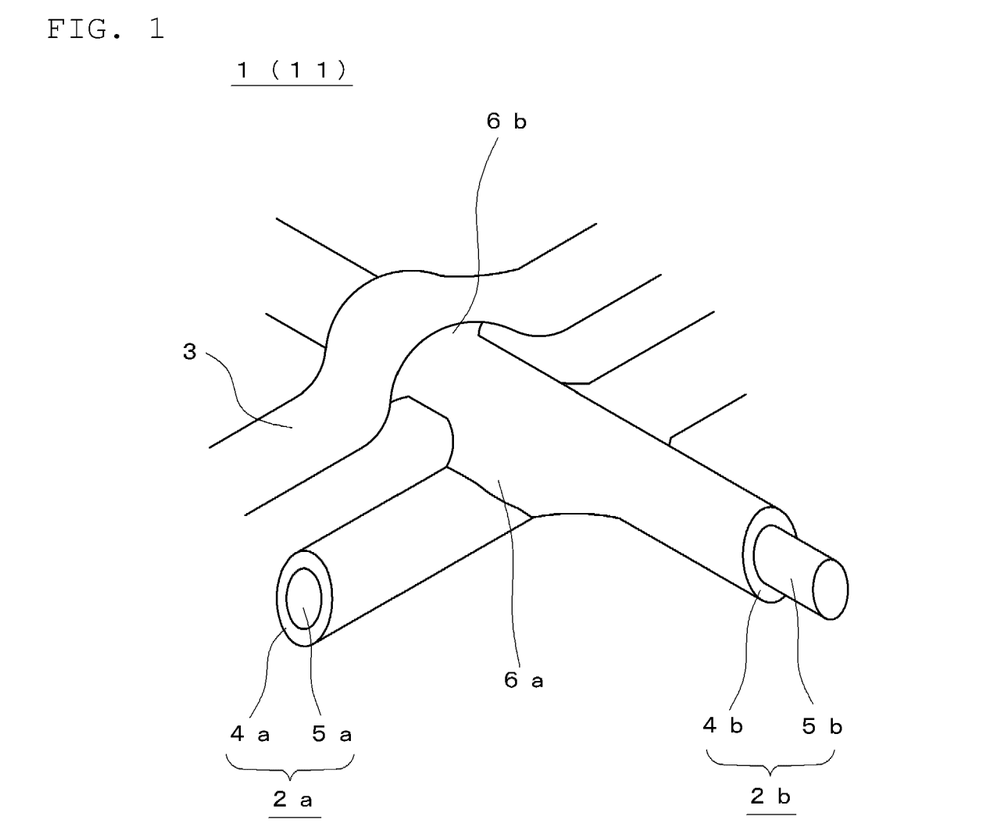
FIG. 1 is a schematic view showing an enlarged structure of a part of a non-woven fabric according to an embodiment of the invention.

FIG. 1 is a schematic view showing an enlarged structure of a part of the non-woven fabric according to the embodiment of the invention.

With reference to the figure, a non-woven fabric body 11 forming a non-woven fabric 1 is formed by integrating composite polyester fibers 2a and 2b and flame-retardant acrylic fibers 3 as other fibers of the rest.

The composite polyester fibers 2a and 2b are obtained by coating a surface of a high melting point polyester with a polyester having a melting point lower than that of the polyester. That is, the composite polyester fibers 2a and 2b have a core-sheath structure in which sheath portions 4a and 4b are made of a low melting point polyester (for example, polyethylene terephthalate having a melting point of 110° C.; PET) and core portions 5a and 5b are made of a high melting point polyester (for example, PET having a melting point of 260° C.), which has a melting point higher than that of the low melting point polyester. In a total amount of 100% by weight of the composite polyester fibers 2a and 2b, 60% by weight of the core portions 5a and 5b (high melting point polyester) is contained.

Further, in a total amount of 100% by weight of the non-woven fabric body 11, 70% by weight of the composite polyester fibers 2a and 2b is contained, and 30% by weight of the flame-retardant acrylic fiber 3 is contained.

Further, when an apparent density [g/cm$^3$] of the non-woven fabric body 11=(the basis weight of the non-woven fabric body)/(the thickness of the non-woven fabric body), the apparent density of the non-woven fabric body 11 is 0.038 g/cm$^3$. The lower the apparent density is, the higher the elasticity tends to be, and the higher the apparent density is, the lower the elasticity tends to be. As described above, the elasticity is the softness due to the touch of a finger, and the high elasticity means a state in which a shape is easily deformed with respect to a pressure and the shape is easily restored when the pressure is released. Then, as described above, the elasticity correlates with the oil absorption of oil smoke and the collection property of dust and dirt. Therefore, by testing the elasticity of the non-woven fabric, it is possible to confirm the oil absorption and the collection property without actually using the non-woven fabric.

If the apparent density is too low, it is difficult to maintain the shape of the non-woven fabric body, and there is a possibility that the processability when processing into a filter is not suitable. Further, if the apparent density is too high, the elasticity becomes too low, and there is a possibility that the oil absorption and the collection property are not suitable. When the non-woven fabric body 11 has an apparent density as described above, the non-woven fabric has an appropriate elasticity, and therefore, the non-woven fabric has high oil absorption and collection property and good processability into a filter.

Here, the non-woven fabric body 11 is formed by laminating a random web on a parallel web. Then, as shown in FIG. 1, a part of a surface of the sheath portion 4b of the composite polyester fiber 2b located above is fused (a state of being melted in a manufacturing process and bonded when cooled) at a bonding point 6a with the composite polyester fiber 2a.

Further, the flame-retardant acrylic fiber 3 is uniformly contained in the entire non-woven fabric body 11, and at a bonding point 6b with the composite polyester fiber 2b, the flame-retardant acrylic fiber 3 and a part of the surface of the sheath portion 4b of the composite polyester fiber 2b are fused.

As described above, the fibers forming the non-woven fabric body 11 are sufficiently bonded to each other.

Further, a bending resistance of the non-woven fabric body 11 in a flow direction of the fibers as the first direction is 79.1 mN·cm. A bending resistance in a width direction as the second direction, which is a direction orthogonal to the flow direction, is 50.0 mN·cm.

The bending resistance refers to a bending resistance measured and calculated according to a JIS L 1913: 2010 "41.5° cantilever method". The higher the bending resistance is, the harder the non-woven fabric will bend. When the bending resistance is too high, there is a risk that the usability will be reduced due to a fold line that occurs after a folding step and the like. Further, the lower the bending resistance is, the easier the non-woven fabric will bend. When the bending resistance is too low, it may be inconvenient when the non-woven fabric body is disposed on a ceiling surface or a slope thereof during use because the non-woven fabric body is inadvertently bent. According to the bending resistance of the non-woven fabric body 11 in the flow direction and the width direction, the non-woven fabric has appropriately strong stiffness.

Then, a bending resistance ratio (the bending resistance in the flow direction/the bending resistance in the width direction) between the bending resistance in the flow direction and the bending resistance in the width direction is 1.6.

Next, a manufacturing process for obtaining such a non-woven fabric will be described.

Figure 2:
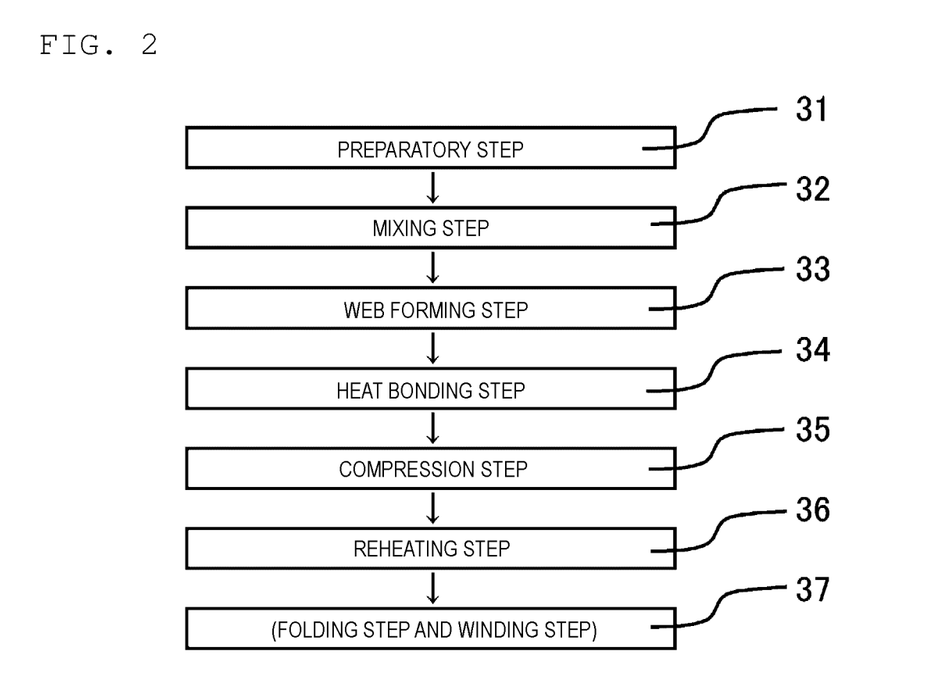
FIG. 2 is a flowchart showing a manufacturing process of the non-woven fabric according to the embodiment of the invention.

FIG. 2 is a flowchart showing the manufacturing process of the non-woven fabric according to the embodiment of the invention.

With reference to the figure, a step 31 is a preparatory step for preparing composite polyester fibers such that the composite polyester fibers are contained in an amount of 40% by weight or more and 80% by weight or less in a total amount of 100% by weight of the fibers to be blended.

Further, other fibers of 20% by weight or more and 60% by weight or less of the rest are prepared. In the present embodiment, a flame-retardant acrylic fiber is used.

A raw cotton of the fibers to be blended is prepared.

Next, a step 32 is a mixing step for uniformly mixing the fibers to be blended.

The raw cotton of the fibers to be blended is loosened, and each of the fibers to be blended as described above is mixed in a weighed state. Accordingly, each of the fibers is uniformly distributed throughout the mixed fibers.

Next, a step 33 is a web forming step for forming a fiber web from the mixed fibers.

The mixed fibers are passed through a plurality of rolls and the like to form a sheet-like fiber web. At this time, the mixed fibers may be formed to any fiber web such as a parallel web, a random web, and a cross web. In the present embodiment, a parallel web in which a fiber arrangement direction is substantially parallel and a strength in the flow direction is high, and a random web in which the fiber arrangement direction is substantially random and the bulkiness can be increased are formed, and a step for laminating a plurality of these fiber webs is included.

Next, a step 34 is a heat bonding step for heat-bonding the fibers contained in the fiber web to obtain a non-woven fabric raw material by subjecting the fiber web to a non-contact heating device.

In the present embodiment, a so-called air-through method is used. That is, as the non-contact heating device, a warm air device that blows heated air as hot air onto the fiber web is used under usual conditions.

Accordingly, the low melting point polyester in the sheath portion of the composite polyester fiber contained in the fiber web is melted and hardened when cooled, and therefore, the fibers contained in the fiber web are heat-bonded to each other to obtain the non-woven fabric raw material.

Next, a step 35 is a compression step for compressing the non-woven fabric raw material in a thickness direction.

The non-woven fabric raw material is wound up with a turret and compressed into a roll.

Next, a step 36 is a reheating step for subjecting the compressed non-woven fabric raw material to the non-contact heating device to obtain a non-woven fabric.

The compressed non-woven fabric raw material is unwound and heated using the warm air device under the conditions of, for example, a heating temperature of 100° C. or more and 200° C. or less and a heating time of 5 seconds or more and 10 minutes or less.

Accordingly, it is possible to obtain the above-described non-woven fabric of the invention, which has high bulkiness and strong stiffness, and particularly has a high bonding force between fibers even in a configuration in which a plurality of fiber webs are laminated.

It is not clear why the non-woven fabric of the invention thus obtained has the high bulkiness and strong stiffness, and particularly has the high bonding force between fibers even in the configuration in which the plurality of fiber webs are laminated, but it is presumed as follows.

As described above, in the non-woven fabric raw material obtained by the air-through method in the heat bonding step, the fibers are bonded to each other, but at this stage, there are many parts where the fibers are not sufficiently bonded to each other.

Therefore, first, when the non-woven fabric raw material is compressed in the thickness direction in the compression step, a force is applied to the fibers, so that the fibers are maintained in a bent state. As a result, apart where the fibers are in contact with each other is generated.

When the compressed non-woven fabric raw material is reheated in the reheating step, a thermal motion of the bent fibers becomes active, and therefore, the fibers try to return to the state before bending. On the other hand, the low melting point polyester in the sheath portion of the composite polyester fiber is melted and bonded by applying heat to the part where the fibers are in contact with each other. That is, the number of bonding points in the non-woven fabric after compression and reheating is larger than the number of bonding points in the non-woven fabric raw material before compression. Therefore, an integrity due to the bonding between the fibers of the non-woven fabric is improved as a whole.

On the other hand, in the part where the fibers are not in contact with each other when the compressed non-woven fabric raw material is reheated, or in the part where the fibers are in contact with each other but separated from each other before being heat-bonded, since the fibers return to the state before the fibers are bent, the bulkiness is restored.

It is presumed that the non-woven fabric of the invention has excellent properties by such a mechanism.

Further, since the non-woven fabric of the invention has flame retardancy by containing flame-retardant fibers, the non-woven fabric can be suitably used as a filter for preventing stains on a range hood and a ventilation fan.

As the filter for preventing stains on a range hood, a ventilation fan, and the like, the thickness of the non-woven fabric is preferably within a range of 0.2 mm or more and 20.0 mm or less, and more preferably within a range of 2.5 mm or more and 8.0 mm or less. When a filter is used for a range hood, a ventilation fan, and the like, air containing oil stains passes through the non-woven fabric of the filter and is filtered. Therefore, such a non-woven fabric preferably has high air permeability and bulkiness. When the thickness of the non-woven fabric is set in the above numerical range, it is possible to achieve both the air permeability and the bulkiness, and the non-woven fabric can be more suitably used as the filter for preventing stains on a range hood, a ventilation fan, and the like.

Next, a step 37 is a folding step and a winding step for forming the non-woven fabric into a desired shape, if necessary.

First, the non-woven fabric is cut into a shape having a desired length and width by a cutter device. Then, a desired number of the cut non-woven fabrics are accumulated and folded by a folding device or rolled into a roll shape by a winding device and the like to form a convenient shape during distribution or product sales.

In the above embodiment, the non-woven fabric is formed of only the non-woven fabric body, but after forming the non-woven fabric body made of the blended fibers, a predetermined pattern of an adhesive is applied to the surface thereof, or a release film to which the predetermined pattern of the adhesive is applied is separately prepared and an adhesive-applied surface of the release film is superimposed on the non-woven fabric body, and therefore, a non-woven fabric (or a non-woven fabric structure) may be formed by transferring the adhesive to the non-woven fabric body and the like. That is, the non-woven fabric body is a part that is substantially a base of the non-woven fabric and is a part made of fibers (composite polyester fiber and the other fibers of the rest) to be blended.

Further, in the above embodiment, predetermined PET is used for both the low melting point polyester and the high melting point polyester, but the polyester is a polymer substance having an ester bond in a molecule, and other than PET, for example, polytrimethylene terephthalate (PTT), polybutylene terephthalate (PBT), and the like can be mentioned. Different types of the polyester may be used for the low melting point polyester and the high melting point polyester. Further, a copolymer component may be contained in a polymer structure in order to improve characteristics of a fiber.

Further, in the above embodiment, the melting point of the low melting point polyester is 110° C., but the melting point is preferably 100° C. or more and 140° C. or less, and more preferably 110° C. or more and 120° C. or less. Further, at this time, the composite polyester fiber preferably contains 20% by weight or more and 50% by weight or less, and more preferably 30% by weight or more and 45% by weight or less of the low melting point polyester in the total amount of 100% by weight of the composite polyester fiber.

With this configuration, since the fibers are sufficiently bonded to each other, and the non-woven fabric body is sufficiently integrated, the non-woven fabric is more suitable for manufacturing a filter.

Further, in the above embodiment, the melting point of the high melting point polyester is 260° C., but the melting point may be any as long as the melting point is higher than that of the low melting point polyester, that is, during the heat bonding step for integration, the low melting point polyester melts, and the high melting point polyester does not substantially melt.

Further, in the above embodiment, there is a core-sheath structure in which the low melting point polyester directly covers the high melting point polyester, but for a structure of another composite fiber, for example, a structure in which a core portion is divided into a plurality of parts and covered with a sheath portion and a structure that is a side-by-side type, as a core-sheath structure, are substantially included in the invention.

Further, in the above embodiment, the flame-retardant acrylic fiber is used as the flame-retardant fiber, but other fibers having flame retardancy such as the flame-retardant polyester fiber may be used. That is, the rest contains flame-retardant fibers. With this configuration, since the flame retardancy can be imparted to the non-woven fabric, the non-woven fabric is suitable for manufacturing a filter preferably having the flame retardancy.

The flame-retardant acrylic fiber described above refers to an acrylic fiber having flame retardancy (a synthetic fiber using acrylonitonyl as a main raw material). For example, the acrylic fiber obtained by blending and kneading a flame retardant is an acrylic-based synthetic fiber (mod acrylic fiber) having self-extinguishing property in which a halogen such as chlorine is contained in a composition, and a fire in an atmosphere is extinguished by releasing halogen-based gas during combustion. By using such a flame-retardant acrylic fiber as the flame-retardant fiber, a non-woven fabric exhibiting sufficient flame retardancy can be obtained, and therefore, a filter having sufficient flame retardancy can be manufactured.

Further, the rest described above may contain not only the flame-retardant fibers but also other fibers. For example, rayon fiber, polyvinyl alcohol (PVA) fiber, and the like can be mentioned, and when these are included as other fibers, it is possible to prevent the molten resin from dripping during combustion. Further, as long as a fiber does not adversely affect an effect of the invention, instead of using the flame-retardant fibers, or in combination with the flame-retardant fibers, for the purpose of improving flame retardancy, a flame retardant such as a phosphorus-based water-soluble flame retardant compound may be attached to the fibers by spraying and the like on the non-woven fabric of the invention. Even in this case, the bonding between the fibers forming the non-woven fabric is mainly due to the heat-bonding between the fibers by the low melting point polyester in the sheath portion of the composite polyester fiber.

Further, the above rest may be made of other fibers without containing the flame-retardant fibers. Even with this configuration, the non-woven fabric can be suitably carried out as a non-woven fabric used for a filter such as a vent filter that does not require flame retardancy. The other fibers may be a single type of fiber or a plurality of types of fibers.

A flame-retardant substance means that it is difficult to ignite itself, and when ignited, the flame-retardant substance burns slowly. The flame-retardant substance is preferable to have a property of preventing the spread of combustion, and is preferable to satisfy Category 3 by a combustibility test according to JACA No. 11A-2003.

Further, in the above embodiment, the composite polyester fiber is contained in an amount of 70% by weight, but may be contained in an amount of 15% by weight or more, and may be preferably contained in an amount of 40% by weight or more and 80% by weight or less based on 100% by weight of the total amount of the non-woven fabric body. With this configuration, the fibers are sufficiently bonded to each other.

Further, when the apparent density of the non-woven fabric=(the basis weight of the non-woven fabric)/(the thickness of the non-woven fabric), the apparent density of the non-woven fabric is within a range of 0.005 g/cm$^3$ or more and 0.040 g/cm$^3$ or less, and may be preferably within a range of 0.007 g/cm$^3$ or more and 0.020 g/cm$^3$ or less. With this configuration, since the non-woven fabric has an appropriate elasticity, the non-woven fabric has high oil absorption and collection property and good processability into a filter.

Further, in the above embodiment, the flow direction is used as the first direction of the non-woven fabric body, but the first direction refers to a direction having the highest bending resistance in the non-woven fabric body (including a state of being a non-woven fabric or a filter), and is usually in a vertical direction or the flow direction that is a manufacturing direction (mechanical direction) of the non-woven fabric. Further, the second direction is a direction orthogonal to the first direction, and is usually a horizontal direction or a width direction.

Further, in the above embodiment, the bending resistances in the flow direction and the width direction of the non-woven fabric body are specific numerical values. The bending resistance in the first direction of the non-woven fabric body is 50 mN·cm or more and 220 mN·cm or less, and it is preferable that the bending resistance in the second direction, which is orthogonal to the first direction, is 20 mN·cm or more and 140 mN·cm or less.

Further, in the above embodiment, the bending resistance ratio (the bending resistance in the flow direction/the bending resistance in the width direction) between the bending resistance in the flow direction (first direction) and the bending resistance in the width direction (second direction) is 1.6, and is preferably within a range of more than 1.0 and 4.0 or less. If the bending resistance ratio is more than 1.0, the bending resistance in the flow direction is higher than the bending resistance in the width direction. When a non-woven fabric is cut in the manufacturing process while a certain pulling force is applied in the flow direction, the fibers are difficult to stretch in the flow direction of the non-woven fabric, and therefore, a dimensional change after cutting is relatively small and it is easy to cut the non-woven fabric to an assumed dimension. Further, if the bending resistance ratio is 4.0 or less, the bending resistance in the flow direction is not too higher than the bending resistance in the width direction. When the non-woven fabric is subjected to adhesive processing while a certain pulling force is applied in the flow direction, the fibers are less likely to shrink in the width direction of the non-woven fabric, and therefore, an assumed adhesive pattern can be easily formed. Therefore, the non-woven fabric is suitable for manufacturing a filter to which such cutting and the adhesive pattern are applied. Naturally, the bending resistance ratio may be 1.0. In order to sufficiently exert such an effect, the non-woven fabric body preferably has a basis weight of 40 g/m$^2$ or more and 80 g/m$^2$ or less.

Further, in the above embodiment, the non-woven fabric body is formed by laminating a fiber web of a parallel web and a fiber web of a random web, but a plurality of fiber webs may be arbitrarily selected from parallel webs, random webs, cross webs, and the like. With this configuration, the fiber webs in a plurality of arrangement directions can be laminated. As a result, even if one fiber web has fibers peeling and is transparent, the non-woven fabric finally obtained by laminating the plurality of fiber webs can prevent peeling and transparency, can easily adjust bulkiness and air permeability to a desired range, and can change the texture and functionality of the non-woven fabric on the front and back thereof.

The non-woven fabric body may be obtained, for example, by laminating different types of fiber webs (parallel web, random web, and the like) as in the present embodiment, by laminating the same type of fiber webs (random web and random web, and the like), and may be formed of a single type of fiber web without being laminated. Compared to the parallel web, in a non-woven fabric body obtained by laminating a plurality of webs containing random webs, the number of bonding points per unit basis weight increases due to the subsequent heat bonding step and reheating step, and therefore, the bulkiness can be improved. Accordingly, it is possible to adjust performances such as the bulkiness.

Further, in the above embodiment, in the preparatory step, the flame-retardant acrylic fiber is prepared in addition to the composite polyester fiber, but at least the composite polyester fiber and the other fibers of the rest described above may be prepared.

Further, in the above embodiment, in the mixing step, the fibers to be blended are uniformly mixed, but it is sufficient that the fibers are uniformly dispersed to the extent that the fibers are considered to be substantially uniform.

Further, in the above embodiment, in each of the heat bonding step and the reheating step, the warm air device is used as the non-contact type heating device, but any method may be used as long as the heat source body and a fiber web to be heated do not come into contact with each other.

Further, in the above embodiment, the reheating step is performed under conditions of a predetermined heating temperature and heating time, but the reheating step may be performed under other conditions. The reheating step is preferably performed under the predetermined conditions described above, and accordingly, since the improvement in bulkiness is stable, a non-woven fabric having higher bulkiness and strong stiffness can be manufactured. Further, the heating temperature in the reheating step is more preferably a temperature higher than the melting point of the low melting point polyester to be used. In the non-woven fabric of the invention, if the apparent density of the non-woven fabric obtained after the heat bonding step is within a predetermined range specified in the invention, the compression step and the reheating step are not essential steps, and as long as the effects of the invention are not affected, other bonding methods such as a needle punching method may be used in combination.

Further, as described above, an adhesive may be applied and the like to the obtained non-woven fabric in a desired pattern, or a pattern may be printed on the obtained non-woven fabric.

Further, in the above embodiment, the non-woven fabric is manufactured by a specific manufacturing method, but may be manufactured by another manufacturing method.

EXAMPLE

Hereinafter, the invention will be specifically described based on Examples. The embodiment of the invention is not limited to Examples.

Samples of Examples and Comparative Examples of the invention were prepared. These samples were subjected to a bending resistance test for measuring a bending resistance, an elasticity evaluation test for sensory evaluation of elasticity, and a combustibility test for evaluating a performance and the like during combustion.

<Configuration of Sample>

As the samples, non-woven fabrics (filters) of Examples 1 to 10 and Comparative Examples 1 to 5 having the configurations shown in Table 1 below were prepared.

TABLE 1

| Fiber type | Fiber diameter (d) | Example 1 | Example 2 | Example 3 | Example 4 | Example 5 | Example 6 | Example 7 | Example 8 |
|---|---|---|---|---|---|---|---|---|---|
| Flame-retardant acrylic | 7 | 15 | 15 | 10 | 10 | 10 | 20 | 20 | |
| PET | 4 | | | | | | 5 | | |
| | 6 | | | | 5 | | | 5 | |
| | 12 | | 5 | 5 | 5 | | 5 | | |
| | 17 | | | | | | | | 21 |
| Composite PET fiber | 4 | 35 | 30 | 25 | 20 | 30 | 30 | 35 | 21 |
| Rayon | 5 | | | | | | | | |
| PVA | 5 | | | | | | | | |
| Flame-retardant PET | 6.6 | | | | | | | | 21 |
| PVA fiber | 7 | | | | | | | | 7 |
| Resin and flame retardant (binder) | | | | | | | | | |
| Reheating step | | With | With | With | With | With | With | With | Without |
| Basis weight (g/m²) | | 50 | 50 | 40 | 40 | 40 | 60 | 60 | 70 |

| Fiber type | Fiber diameter (d) | Example 9 | Example 10 | Comparative Example 1 | Comparative Example 2 | Comparative Example 3 | Comparative Example 4 | Comparative Example 5 |
|---|---|---|---|---|---|---|---|---|
| Flame-retardant acrylic | 7 | | | | | | | 15 |
| PET | 4 | | | 8 | | 22 | | |
| | 6 | | | 8 | 30 | 21 | | |
| | 12 | | | | | | 100 | |
| | 17 | 21 | 21 | | | | | |
| Composite PET fiber | 4 | 21 | 21 | | | | | 35 |
| Rayon | 5 | | | 2 | 3 | 4 | 5 | |
| PVA | 5 | | | 2 | 3 | 4 | 5 | |
| Flame-retardant PET | 6.6 | 21 | 21 | | | | | |
| PVA fiber | 7 | 7 | 7 | | | | | |

TABLE 1-continued

| | | | | | | | | | | | |
|---|---|---|---|---|---|---|---|---|---|---|---|
| Resin and flame retardant (binder) | | | | | 10 | 14 | 19 | 30 | | | |
| Reheating step | Without | Without | — | — | — | — | Without | | | | |
| Basis weight (g/m²) | 70 | 70 | 30 | 50 | 70 | 140 | 50 | | | | |

| | Sample | | | | | | | | | | |
|---|---|---|---|---|---|---|---|---|---|---|---|
| Composite PET fiber | Example 1 | Example 2 | Example 3 | Example 4 | Example 5 | Example 6 | Example 7 | Example 8 | Example 9 | Example 10 | Comparative Example 5 |
| Core portion: PET (weight %) | 60 | 60 | 60 | 80 | 60 | 70 | 50 | 60 | 60 | 60 | 60 |
| Sheath portion: low melting point PET (weight %) | 40 | 40 | 40 | 20 | 40 | 30 | 50 | 40 | 40 | 40 | 40 |

A unit "d" of a fiber diameter in the table is denier.

Further, a unit of numbers in the table is g/m² unless otherwise specified.

Further, blanks in the table indicate that a fiber type is substantially free. Further, "-" in Comparative Examples 1 to 4 in a reheating step in the table indicates that the reheating step cannot be conceived because the samples are formed by using a method of binding fibers to each other by a binder.

Further, a "resin and flame retardant (binder)" in the table means that a halogen-based flame retardant is blended with a thermoplastic resin to impart a function as a binder for binding fibers to each other and a flame retardant function during combustion.

Further, "low melting point PET" of a sheath portion of a "composite PET fiber" in the table had a melting point of 110° C. to 140° C.

Examples 1 to 10 were prepared using the manufacturing method of the filter described above. The non-woven fabrics of Examples 1 to 7 have improved bulkiness and stiffness through a compression step and the reheating step after obtaining a non-woven fabric raw material by an air-through method. The non-woven fabrics of Examples 8 to 10 are different from those of Examples 1 to 7 after the non-woven fabric raw material is obtained by the air-through method with the same fiber type composition. Further, the non-woven fabric fibers were bonded by changing each of needle piercing conditions by a needle punch method, and the compression step and the reheating step were not performed.

Comparative Example 5 had the same fiber type composition as that of Example 1 described above, and was prepared in a state of the non-woven fabric raw material without performing the reheating step.

Further, Comparative Examples 1 to 4 are all non-woven fabrics (commercially available products) using a binder in the related art.

<Bending Resistance Test and Range Hood Mounting Test>

For the samples prepared as described above, first, as a bending resistance test, a bending length (unit: mm) was measured according to a JIS-L-1096 A method "45° cantilever method", and the bending resistance (unit: mN·cm) was calculated according to a JIS L 1913: 2010 "41.5° cantilever method".

Further, a range hood mounting test was performed to confirm mountability to a range hood.

First, a filter in a state immediately after cutting each of the samples to a test piece size of 60 cm×36 cm as "before bending" was prepared. Next, the filters related to each of the samples were packaged in a state of being folded in three in a direction of 60 cm, and the filters stored for 1 month were prepared as "1 month after bending".

The filters related to each of the samples were attached to a range hood of "BDR-3HL-601BK" manufactured by Fuji Industries, Ltd., and the mountability was confirmed.

<Apparent Density>

An apparent density of the non-woven fabric was calculated by the following formula by measuring a basis weight and a thickness of the non-woven fabric.

Apparent density [g/cm³] of non-woven fabric=(basis weight of non-woven fabric)/(thickness of non-woven fabric)   Formula 1

The basis weight of the non-woven fabric indicates a weight of the non-woven fabric per unit area. The thickness of the non-woven fabric indicates an average thickness (that is, an average thickness of the non-woven fabric measured under a load of 0.8 g/cm²) of the non-woven fabric in a state where an 80 g plate of 10 cm×10 cm (a weight may be placed on the plate to make a total of 80 g) is superimposed on the non-woven fabric.

<Elasticity Evaluation Test>

In the elasticity evaluation of the non-woven fabric, 10 testers were asked to evaluate whether the feel when the non-woven fabric was grasped with both hands had the same or higher elasticity (softness) based on Comparative Example 3. According to evaluation results of the testers, the elasticity was evaluated as ⊚ to x as follows.

⊚: 8 or more out of 10 testers evaluate that the elasticity is equal to or greater than that of Comparative Example 3

○: 5 to 7 out of 10 testers evaluate that the elasticity is equal to or greater than that of Comparative Example 3

Δ: 2 to 4 out of 10 testers evaluate that the elasticity is equal to or greater than that of Comparative Example 3 x: 1 or less out of 10 testers evaluates that the elasticity is equal to or greater than that of Comparative Example 3

The results are shown in Table 2 below.

TABLE 2

| Sample | Basis weight (g/m²) | Flow direction Bending length (mm) | Flow direction Bending resistance (mN·cm) | Width direction Bending length (mm) | Width direction Bending resistance (mN·cm) | Bending resistance ratio (Flow direction/Width direction) | Thickness (mm) | Apparent density (g/cm³) | Elasticity evaluation | Mountability to range hood Before bending | Mountability to range hood 1 month after bending |
|---|---|---|---|---|---|---|---|---|---|---|---|
| Example 1 | 50 | 117 | 79.1 | 100 | 50.0 | 1.6 | 1.3 | 0.038 | ○ | ○ | ○ |
| Example 2 | 50 | 101 | 51.5 | 74 | 20.3 | 2.5 | 1.4 | 0.036 | ○ | ○ | ○ |
| Example 3 | 40 | 120 | 69.1 | 102 | 42.4 | 1.6 | 1.1 | 0.036 | ○ | ○ | ○ |
| Example 4 | 40 | 111 | 54.7 | 109 | 51.8 | 1.1 | 1.0 | 0.040 | ○ | ○ | ○ |
| Example 5 | 40 | 131 | 89.9 | 83 | 22.9 | 3.9 | 1.0 | 0.040 | ○ | ○ | ○ |
| Example 6 | 60 | 107 | 73.5 | 70 | 20.6 | 3.6 | 1.8 | 0.033 | ○ | ○ | ○ |
| Example 7 | 60 | 125 | 117.2 | 118 | 98.6 | 1.2 | 1.8 | 0.033 | ○ | ○ | ○ |
| Example 8 | 70 | 145 | 213.4 | 124 | 133.5 | 1.6 | 8.0 | 0.009 | ◎ | ○ | ○ |
| Example 9 | 70 | 134 | 168.4 | 124 | 133.5 | 1.3 | 6.0 | 0.012 | ◎ | ○ | ○ |
| Example 10 | 70 | 121 | 124.0 | 120 | 121.0 | 1.0 | 4.0 | 0.018 | ◎ | ○ | ○ |
| Comparative Example 1 | 30 | 59 | 6.2 | 58 | 5.9 | 1.1 | 0.7 | 0.043 | Δ | x | ○ |
| Comparative Example 2 | 50 | 121 | 88.6 | 46 | 4.9 | 18.2 | 1.1 | 0.045 | Δ | x | ○ |
| Comparative Example 3 | 70 | 134 | 168.4 | 124 | 133.5 | 1.3 | 6.0 | 0.012 | — | ○ | x |
| Comparative Example 4 | 140 | 150 | 472.5 | 123 | 260.5 | 1.8 | 10.0 | 0.014 | ◎ | ○ | x |
| Comparative Example 5 | 50 | 105 | 57.9 | 61 | 11.3 | 5.1 | 1.0 | 0.050 | x | x | ○ |

The bending resistance was calculated by the following formula.

$$G = m \times C^3 \times 10^{-3}$$

In the formula, G indicates a bending resistance (mN·cm), in which m indicates a mass per unit area of a test piece (g/m²), that is, a basis weight, and C indicates an average bending length of whole (cm). In the formula, an acceleration of free fall at 9.81 m/s² is rounded to 10 m/s².

Further, as an evaluation of the mountability to the range hood, "○" in "before bending" in the table indicates that the filter had appropriate stiffness and was suitable for mounting on the range hood, and "x" indicates that the filter was not stiff and was not suitable for mounting on the range hood. Further, "○" in "1 month after bending" indicates that the filter was suitable because there was no gap between the filter and the range hood or even if there was a slight gap between the filter and the range hood when the filter was mounted on the range hood, and "x" indicates that the filter was unsuitable because a fold line remained in the filter and a gap was generated between the filter and the range hood when the filter was mount on the range hood.

With reference to Table 2, in Examples 1 to 10, the bending resistance in a flow direction is 79.1 mN·cm, 51.5 mN·cm, 69.1 mN·cm, 54.7 mN·cm, 89.9 mN·cm, 73.5 mN·cm, 117.2 mN·cm, 213.4 mN·cm, 168.4 mN·cm, and 124.0 mN·cm, respectively. The bending resistance in a width direction is 50.0 mN·cm, 20.3 mN·cm, 42.4 mN·cm, 51.8 mN·cm, 22.9 mN·cm, 20.6 mN·cm, 98.6 mN·cm, 133.5 mN·cm, 133.5 mN·cm, and 121.0 mN·cm, respectively. Therefore, the non-woven fabric of the invention is different from the non-woven fabrics (Comparative Examples 1 to 5) in the related art. It was confirmed that the bending resistance in the first direction is 50 mN·cm or more and 220 mN·cm or less, and the bending resistance in the second direction, which is orthogonal to the first direction, is 20 mN·cm or more and 140 mN·cm or less.

Further, in Examples 1 to 10, bending resistance ratios (the bending resistance in the flow direction/the bending resistance in the width direction) are 1.6, 2.5, 1.6, 1.1, 3.9, 3.6, 1.2, 1.6, 1.3, and 1.0, respectively. Further, in each of Examples 1 to 10, the mountability to the range hood was ○ (suitable) regardless of whether the filter was "before bending" or "1 month after bending". Therefore, it was confirmed that the non-woven fabric and the filter of the invention have a bending resistance ratio of the bending resistance in the first direction to the bending resistance in the second direction within a range of more than 1.0 and 4.0 or less. It was confirmed that a filter made of a non-woven fabric having such a bending resistance ratio has an appropriate stiffness and is suitable for mounting on the range hood.

Further, Examples 1 to 10 were evaluated as ◎ or ○ in the elasticity evaluation, and it was confirmed that the elasticity was appropriate.

Further, when Example 1 and Comparative Example 5 are compared, it was confirmed that when the reheating step is not performed in the manufacturing process as in Comparative Example 5, the bending resistances in the flow direction and the width direction are lower than that in Example 1, the mountability to the range hood before bending is inappropriate, the apparent density was high, and the elasticity was poor, but when the reheating step was performed in the manufacturing process as in Example 1, the bending resistance ratio was within a preferable range, the mountability to the range hood before bending was also preferable, and the elasticity was also appropriate.

<Flame Retardancy Test>

A flame retardancy test was performed to evaluate the performance during combustion using Examples 1 to 10 and Comparative Example 2 in the related art having the same basis weight as Example 1, containing a binder and having flame retardancy.

The results are shown in Table 3 below.

TABLE 3

|  | Example 1 | Example 2 | Example 3 | Example 4 | Example 5 | Example 6 | Example 7 | Example 8 | Example 9 | Example 10 | Comparative Example 2 |
|---|---|---|---|---|---|---|---|---|---|---|---|
| Flame retardancy | Category 3 | Category 3 | Category 3 | Category 3 | Category 3 | Category 3 | Category 3 | Category 3 | Category 3 | Category 3 | Category 3 |
| Flambé test | No molten ball | No molten ball | No molten ball | No molten ball | No molten ball | No molten ball | No molten ball | No molten ball | No molten ball | No molten ball | No molten ball |
| Lighter flame spread test | No unevenness in spread of flame | No unevenness in spread of flame | No unevenness in spread of flame | No unevenness in spread of flame | No unevenness in spread of flame | No unevenness in spread of flame | No unevenness in spread of flame | No unevenness in spread of flame | No unevenness in spread of flame | No unevenness in spread of flame | Unevenness in spread of flame |

In the table, the "flame retardancy" indicates a performance evaluated according to JACA No. 11A-2003 combustion test.

In the table, the "flambé test" indicates whether a molten resin fell as a ball when each sample was burned.

Further, in the table, the "lighter flame spread test" indicates a flame spreading method evaluated by a plurality of times of tests in which each sample is cut into a strip shape, one end is held, and the flame of a lighter is brought closer from the other end side. Further, "no unevenness in spread of flame" indicates that the spread of flame did not occur at any of test parts and the flame retardancy was good. "Unevenness in spread of flame" indicates that the spread of flame has occurred at least one of the test parts, and the flame retardancy is non-uniform and not good.

Then, from the results of "flame retardancy" in Table 3, it was confirmed that all of Examples 1 to 10 have flame retardancy satisfying Category 3 as in Comparative Example 2, that is, having flame retardancy.

Further, from the results of the "flambé test", it was confirmed that in each of Examples 1 to 10, a drip in which the molten resin during combustion was dropped as a ball did not occur as in Comparative Example 2.

Further, from the results of the "lighter flame spread test", it was confirmed that in each of Examples 1 to 10, there was no unevenness in spread of flame during combustion, and the flame retardancy of the entire non-woven fabric was better than that of Comparative Example 2.

INDUSTRIAL APPLICABILITY

As described above, the non-woven fabric and the filter using the non-woven fabric according to the invention are suitable for preventing stains on, for example, a range hood, a ventilation fan, a vent, and the like.

The invention claimed is:

1. A non-woven fabric (1), which is formed of a composite polyester fiber (2) having a core-sheath structure in which a sheath portion (4) is a low melting point polyester and a core portion (5) is a high melting point polyester having a higher melting point than that of the low melting point polyester and the other fibers (3) of the rest, the non-woven fabric (1) comprising:

a non-woven fabric body (11) in which the composite polyester fiber and the other fibers of the rest are integrated, wherein the non-woven fabric body contains the composite polyester fiber in an amount of 15% by weight or more and 80% by weight or less based on a total amount of 100% by weight of the non-woven fabric body, when an apparent density of the non-woven fabric body=(a basis weight of the non-woven fabric body)/(a thickness of the non-woven fabric body), the apparent density of the non-woven fabric body is 0.005 g/cm$^3$ or more and 0.040 g/cm$^3$ or less, and a bending resistance of the non-woven fabric body in a first direction is 50 mN·cm or more and 220 mN·cm or less, and a bending resistance in a second direction, which is orthogonal to the first direction, is 20 mN·cm or more and 140 mN·cm or less.

2. The non-woven fabric according to claim 1, wherein the non-woven fabric body has a basis weight of 40 g/m$^2$ or more and 80 g/m$^2$ or less, and a bending resistance ratio (the bending resistance in the first direction/the bending resistance in the second direction) between the bending resistance in the first direction and the bending resistance in the second direction is within a range of more than 1.0 and 4.0 or less.

3. The non-woven fabric according to claim 1, wherein the rest contains a flame-retardant fiber.

4. The non-woven fabric according to claim 3, wherein the flame-retardant fiber contains a flame-retardant acrylic fiber or a flame-retardant polyester fiber.

5. A filter for preventing stains a range hood or a ventilation fan using the non-woven fabric according to claim 3.

6. The non-woven fabric according to claim 1, wherein a melting point of the low melting point polyester is 100° C. or more and 140° C. or less, and the composite polyester fiber contains 20% by weight or more and 50% by weight or less of the low melting point polyester based on a total amount of 100% by weight of the composite polyester fiber.

\* \* \* \* \*